INVENTOR.
JOHN YOUNG, JR.
BY
ATTORNEY

Sept. 13, 1960

J. YOUNG, JR 2,952,069

METHOD OF WINDING STATORS

Original Filed Jan. 23, 1957

Sept. 13, 1960  J. YOUNG, JR  2,952,069
METHOD OF WINDING STATORS
Original Filed Jan. 23, 1957  5 Sheets-Sheet 3
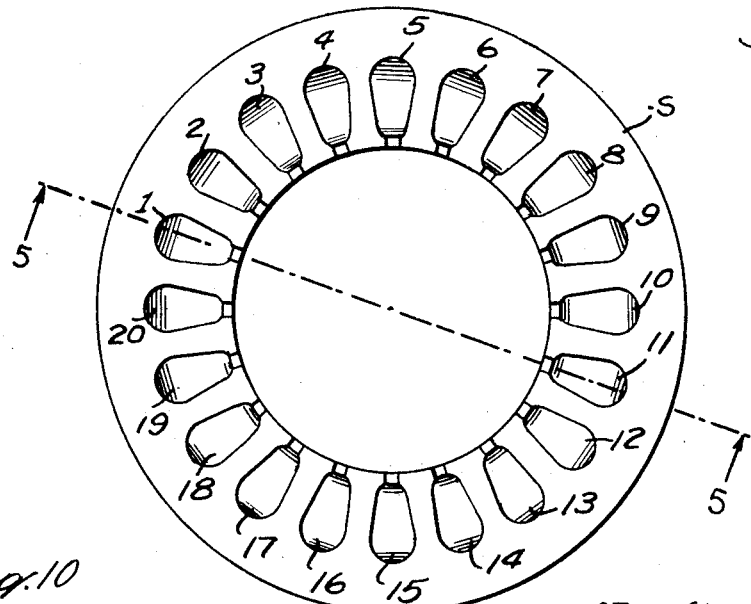
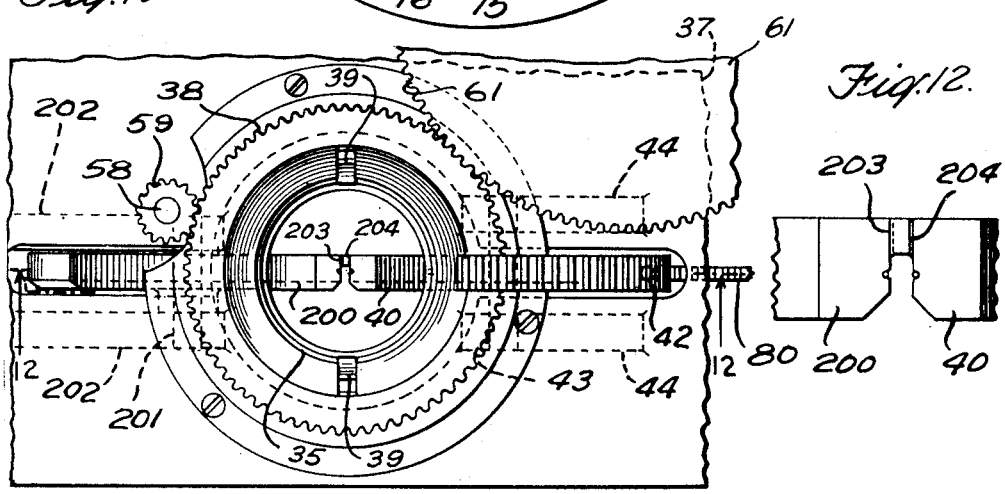
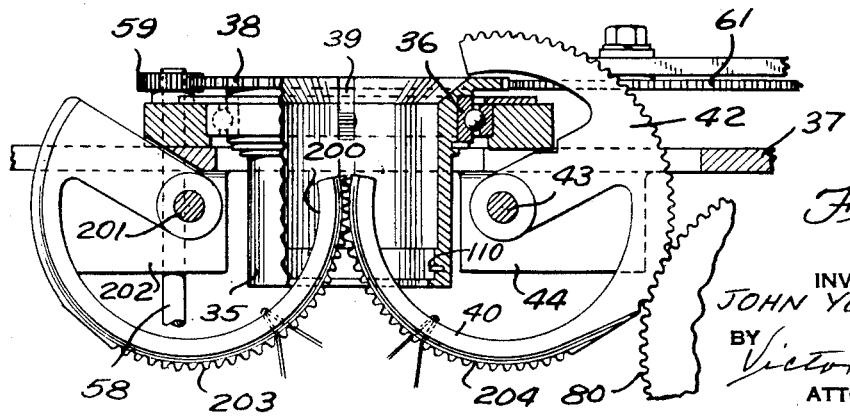
INVENTOR
JOHN YOUNG, JR
BY
ATTORNEY Sept. 13, 1960  J. YOUNG, JR  2,952,069
METHOD OF WINDING STATORS
Original Filed Jan. 23, 1957  5 Sheets-Sheet 4

INVENTOR.
JOHN YOUNG, JR
BY
ATTORNEY

Sept. 13, 1960 J. YOUNG, JR 2,952,069
METHOD OF WINDING STATORS
Original Filed Jan. 23, 1957 5 Sheets-Sheet 5

INVENTOR
JOHN YOUNG, JR.
BY
ATTORNEY

United States Patent Office 2,952,069
Patented Sept. 13, 1960

2,952,069

METHOD OF WINDING STATORS

John Young, Jr., Corona, N.Y., assignor to Sperry Rand Corporation, Long Island City, N.Y., a corporation of Delaware Original application Jan. 23, 1957, Ser. No. 635,756, now Patent No. 2,835,453, dated May 20, 1958. Divided and this application May 27, 1958, Ser. No. 738,055

4 Claims. (Cl. 29—155.5)

This invention relates to a method of winding the stators of small motors, generators, resolvers, synchros, and similar apparatus; and this application is a division of my co-pending application Serial No. 635,756, which was filed January 23, 1957, and on which Patent No. 2,835,453 was issued on May 20, 1958.

The principal object of the invention is to provide a method of winding small electrical apparatus stators by which the number of winding operations previously required is materially reduced thereby substantially reducing the time and cost of winding.

Another object of the invention is to provide a new and novel method of winding stators by which the stators are wound more uniformly in a smaller space, and by which the coils are wound directly onto a stator instead of onto a bobbin and then fed onto the stator.

Another object of the invention is to provide a method of winding stators of the aforesaid character by which the winding wire is wound directly into the stator slots, and by which the wire loops about the ends of the stator are more evenly distributed between stator slots.

Another object of the invention is to provide a winding method which is very flexible and can be used in winding various types of stators.

Having stated the principal objects of the invention other and more limited objects of the invention will be apparent from the following specification and the accompanying drawings forming a part thereof in which:

Fig. 3 is a plan view of a stator shell of the type adapted to be wound by the winding mechanism shown in Figs. 1 and 2;

Fig. 10 is a fragmentary plan view of a modified form of the winding mechanism of Figs. 1 to 9 in which two winding fingers are employed;

Fig. 11 is a fragmentary vertical sectional view through the mechanism shown in Fig. 10 taken substantially on the line 11—11 of Fig. 10; and Fig. 12 is an enlarged fragmentary detail plan view showing the manner in which the two winding fingers of Figs. 10 and 11 are geared together for operation in unison.

Figure 1:
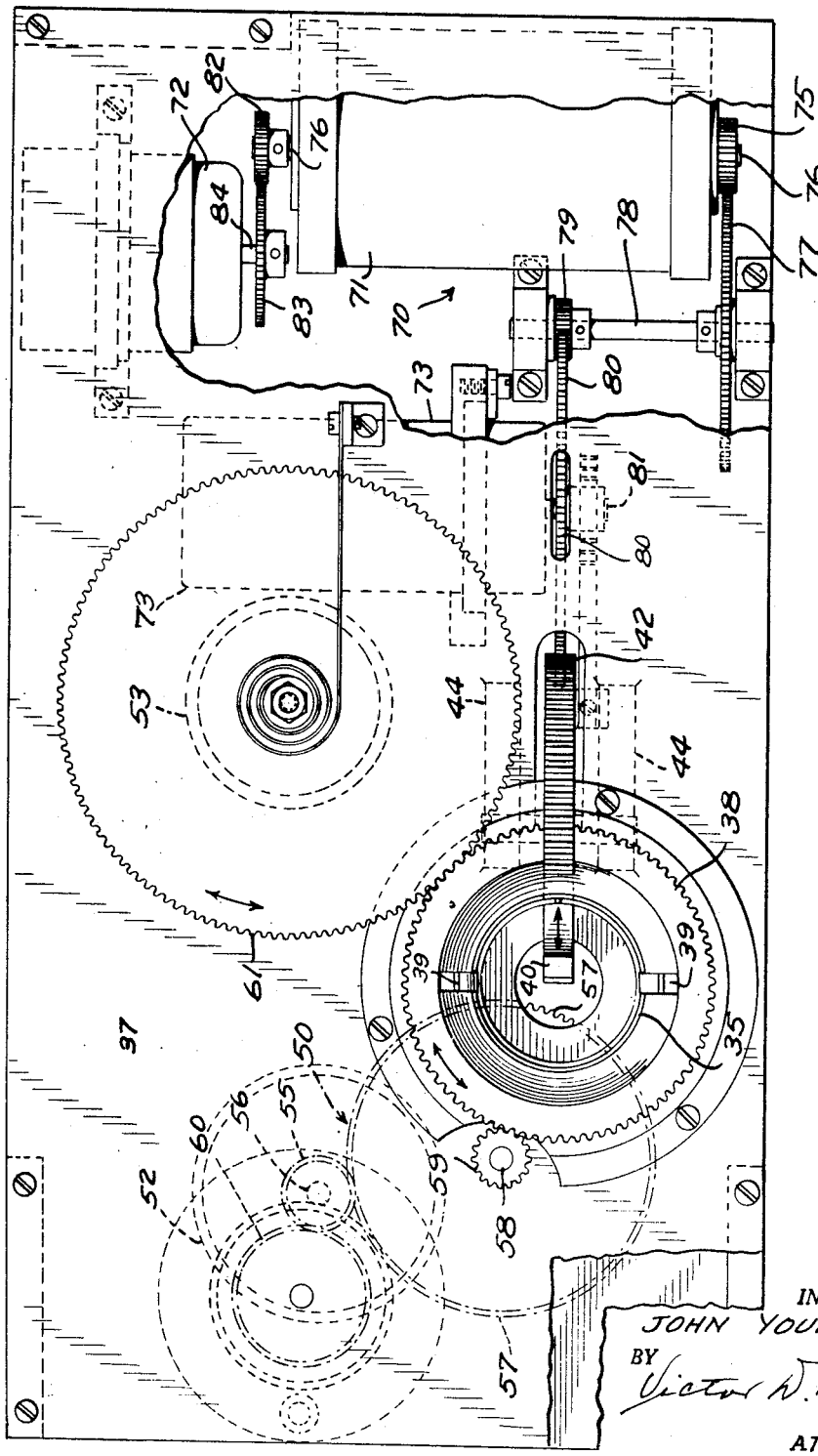
Fig. 1 is a plan view, partially broken away, of a winding mechanism by which stators are automatically wound in accordance with my new and improved method.

In winding stator shells in accordance with my invention I employ a pair of similar end caps one of which is secured to each end of a stator shell prior to winding. The winding mechanism, as shown and described herein, comprises generally an open ended rotatably mounted vertical cylindrical cage in which a stator shell with the end caps thereon is secured in definite fixed position for rotation therewith; an accurate winding finger which extends up through the cage and a stator shell therein and is adapted to be moved up and down, within a stator shell during operation; and driving and control means by which the cage and finger are actuated in definite predetermined sequential timed relation with respect to each other.

The end caps each comprises a base having three concentric annular grooves or zones in the upper surface thereof and three upwardly and outwardly extending concentric conical flanges one of which is disposed around the inner edge of each of the grooves. These flanges progressively increase in height from the innermost flange outwardly, and are provided with radially extending vertical slots which are adapted to register with certain of the slots in the stator shell to which the cap is applied.

The cage is rotatably supported adjacent the upper end thereof for rotation about a vertical axis by a suitable antifriction bearing which is secured in fixed position on the top of a table. The cage is provided with clamping means by which a stator shell is held in definite fixed position therein, and a gear around the upper end thereof through which the cage is rotated back and forth during operation.

The winding finger is carried by a segmental gear which is radially disposed with respect to the cage and is adapted to be rotated back about a horizontal axis. The finger is provided with a threading nozzle through which a predetermined number of loops of wire are inserted into selected pairs of stator slots as the finger carries the nozzle up and down through the stator shell during operation.

The driving mechanism by which the cage and finger are actuated in predetermined sequentially timed relation with respect to each other may be of various types. It may be mechanical using hydraulic or pneumatic units to power the equipment or it may be any one of various types of servos. However, at present I prefer to use two servo mechanisms of the electronic type, as shown herein, one of which is the finger actuating mechanism and the other of which is the cage actuating mechanism. These servo mechanisms comprise servo motors, rate generators, resolvers and servo amplifiers and controls. The servo mechanisms are controlled by a programming mechanism which determines the extent of the up and down movement of the winding finger and the extent of the back and forth rotary movement of the cage, and by an electrical preset counter-mechanism which determines the number of loops of wire in each pair of stator slots and the order in which selected pairs of slots are successively wound.

The winding mechanism is designed to automatically successively wind a predetermined number of loops of wire into selected pairs of stator slots until the stator is completely wound by first winding the wire into a plurality of pairs of slots with the tops and bottoms of the loops disposed in the outermost groove or zone of the end caps, behind the outermost annular flange associated therewith. The wire is then wound into other pairs of slots with the tops and bottoms of the loops disposed in the intermediate groove or zone of the end caps, behind the intermediate annular flange associated therewith, and finally wound into still other pairs of slots with the tops and bottoms of the loops disposed in the innermost groove or zone of the end caps, behind the innermost annular flange associated therewith.

In operation the winding finger carries the threading nozzle up and down, through a stator shell being wound and having the end caps applied thereto, between an uppermost position above and slightly behind the outermost top cap flange and a lowermost position below and slightly behind the outermost bottom cap flange with a dwell in the movement thereof at the uppermost and lowermost positions, during which dwells the cage is rotated in first one direction and then the reverse to bring first one stator slot of a selected pair of stator slots into register with the threading nozzle and then the other stator slot of the selected pair of slots into register with the threading nozzle. As the nozzle is moved downwardly it inserts the wire into the registering stator slot, and then as the cage and stator shell are rotated during the low position dwell of the nozzle to bring the other slot of the selected pair of slots into register therewith it lays the wire in the outermost zone of the bottom cap behind the outermost flange thereof. During the upward movement of the nozzle it inserts the wire into the then registering stator slot, and then as the stator shell is rotated in the reverse direction during the high position dwell of the nozzle to bring the first stator slot back into register with the nozzle it lays the wire in the outermost zone of the top cap behind the outermost flange thereof which completes one loop. This operation is repeated until the predetermined number of loops have been wound into this pair of slots, after which the back and forth movement of the cage is automatically changed to successively alternately bring first one slot and then the other slot of another selected pair of slots into register with the nozzle. After the selected number of pairs of slots have been wound with the tops and bottoms of the loops disposed in the outermost zones of the caps behind the outermost flanges thereof, the movement of the winding finger is automatically changed so that the nozzle is carried up and down between an uppermost position above and slightly behind the intermediate top cap flange and a lowermost position below and slightly behind the intermediate bottom cap flange, and at the same time the back and forth rotation of the cage and shell therein is changed in accordance with the location of the slots of other selected pairs of slots to be wound with the tops and bottoms of the loops disposed in the intermediate zones of the caps between the intermediate and outermost flanges thereof. Finally the movement of the winding finger is again automatically changed so that it carries the threading nozzle up and down between an uppermost position above and slightly behind the innermost top cap flange and a lowermost position below and slightly behind the innermost bottom cap flange, and at the same time the back and forth rotation of the cage and shell therein is changed in accordance with the location of the slots of still other selected pairs of slots which are to be wound with the tops and bottoms of the loops disposed in the innermost zones of the caps between the innermost and intermediate flanges thereof.

In view of the fact that in many types of stators the stator slots are not parallel to the axis of the stator but are disposed at a slight angle with respect thereto, as shown herein, means is provided by which the cage is slightly rotated during the up and down movement of the nozzle in the proper direction and speed to always maintain the section of a slot directly opposite the nozzle in the plane of the nozzle path.

The construction and operations of the winding mechanism will now be specifically described in connection with the drawing by reference characters. The mechanism as shown herein is designed to wind a stator shell S having twenty equally spaced helically inclined stator slots therein which are consecutively numbered 1 to 20.

Before winding a pair of similar end caps C are applied to the stator shell S, one at each end thereof. Each cap C comprises a base 25 and three spaced upwardly and outwardly extending concentric annular flanges 26, 27 and 28 of progressively different heights, the outermost flange 28 being the highest, the intermediate flange 27 the next highest and the innermost flange 26 the lowest. The flanges 26, 27 and 28 define three concentric annular grooved zones, 29 being the innermost zone, 30 the intermediate zone and 31 the outermost zone. The flanges 26, 27 and 28 are each provided with a different number of vertical slots 32 which are adapted to register with certain preselected stator slots of the stator shell S. The number and location of the slots 32 in the flanges 26, 27 and 28 is dependent upon the setting of the winding mechanism and the sequence in which various preselected pairs of stator slots are to be wound by the winding mechanism.

As shown herein the winding mechanism is set to first wind the slots 5 and 6 and then the slots 1 and 10 with the tops and bottoms of the winding loops being disposed in the outermost zones 31 behind the outermost flanges 28 of the end caps C. The slots 4 and 7 and then the slots 2 and 9 are next wound with the tops and bottoms of the winding loops being disposed in the intermediate zones 30 behind the intermediate flanges 27 of the end caps C. Finally the slots 3 and 8 are wound with the tops and bottoms of the winding loops being disposed in the innermost zones 29 behind the flanges 26 of the end caps C. After the first ten stator slots have been wound the winding cage and the stator shells therein are automatically rotated 180° and then the other ten stator slots are wound in the following order: 15 and 16, 11 and 20, 14 and 17, 12 and 19, and finally 13 and 18. The tops and bottoms of the winding loops between slots 15 and 16, and between 11 and 20 are disposed in the outermost zones 31 of the caps C. The tops and bottoms of the winding loops between the slots 14 and 17 and between slots 12 and 19 are disposed in the intermediate zones 30 of the end caps C, and the tops and bottoms of the winding loops between the slots 13 and 18 are disposed in the innermost zones 29 of the end caps C.

The innermost flange 26 of the end caps C therefore has twenty slots 32 therein to register with all twenty of the stator shell slots. The intermediate flange 27 has sixteen slots 32 therein which are adapted to register with stator shell slots 1, 2, 4, 5, 6, 7, 9, 10, 11, 12, 14, 15, 16, 17, 19 and 20, and the outermost flange 28 has eight slots 32 therein which are adapted to register with stator shell slots 1, 5, 6, 10, 11, 15, 16 and 20, respectively. If the winding mechanism was set to wind preselected pairs of stator slots in a different sequence the flanges 26, 27 and 28 would then be slotted accordingly.

The winding mechanism by which preselected pairs of stator slots of a stator shell S having twenty stator slots therein are automatically wound in the sequence previously stated comprises a vertically disposed open ended cylindrical cage 35 which is rotatably supported by an antifriction bearing 36 which is suitably secured in fixed position on a table 37. The cage 35 is provided with an annular gear flange 38 around the upper end thereof through which the cage 35 is rotated back and forth during operation. The cage 35 is adapted to receive a stator shell S having the end caps C applied thereto and hold it in definite fixed position by means of a dowel 110 and a pair of spring fingers 39 carried by the cage 35.

Figures 2, 7:
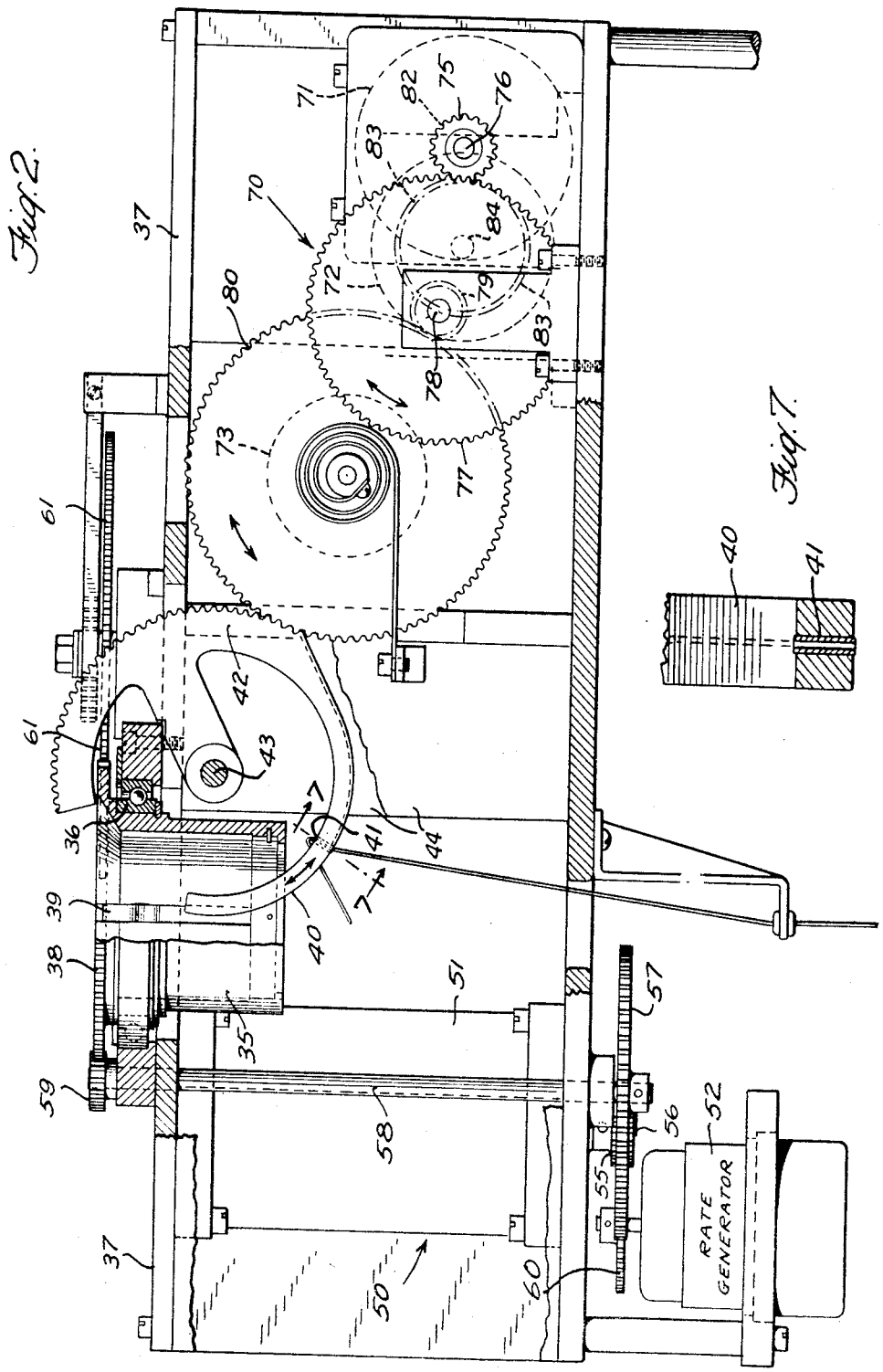
Fig. 2 is a front elevation, partially broken away, of the winding mechanism shown in Fig. 1.
Fig. 7 is an enlarged fragmentary detail sectional view through the winding finger showing the threading nozzle, the plane of the section being indicated by the line 7—7 on Fig. 2.
Figure 9:
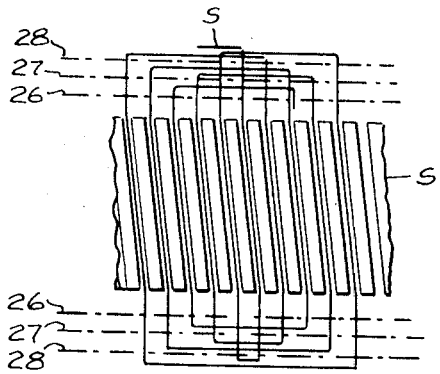
Fig. 9 is a diagrammatic view in elevation further illustrating the sequential winding of selected pairs of shell slots.
Figure 6:
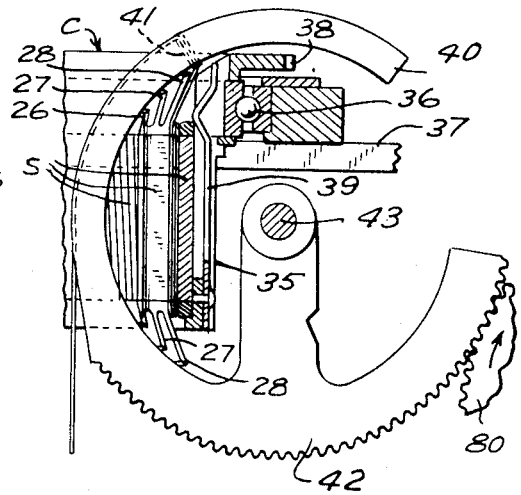
Fig. 6 is a fragmentary vertical sectional view showing a stator shell being wound.
Figure 4:
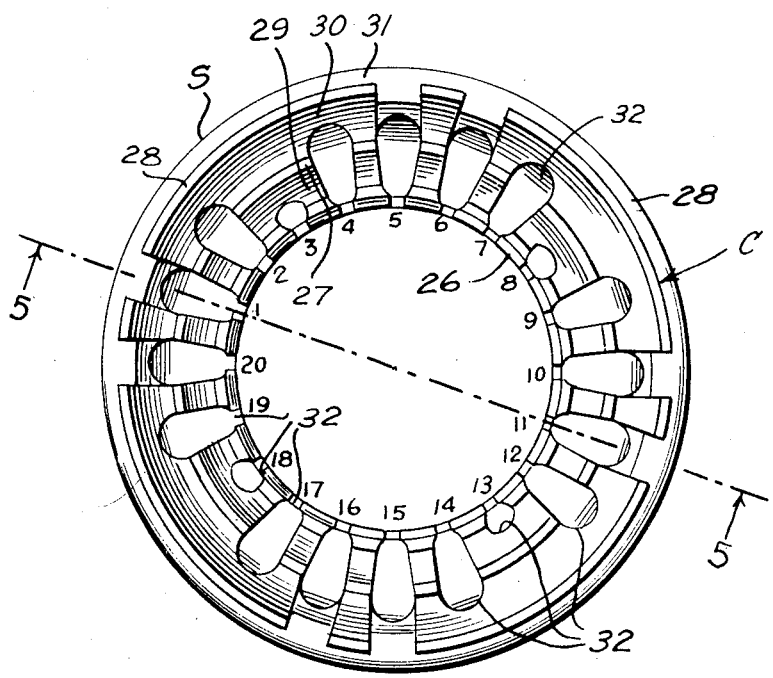
Fig. 4 is a view similar to Fig. 3 showing an end cap applied to the stator shell preparatory to winding.
Figure 5:
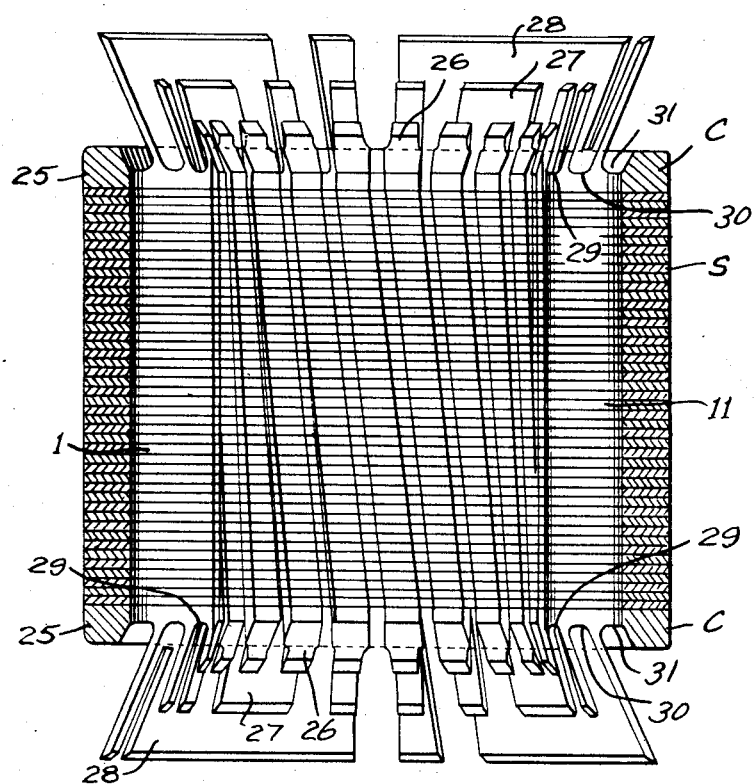
Fig. 5 is a vertical sectional view through the stator shell of Fig. 3 with end caps applied to each end thereof, the plane of the section being indicated by the line 5—5 on Figs. 3 and 4.

A winding finger 40 having a threading nozzle 41 is formed integrally with or otherwise secured to a segmental gear 42 which is rotatably mounted upon a horizontal shaft 43 carried by brackets 44 secured to and extending downwardly from the underside of the table 37. The finger 40 and gear 42 are disposed radially with respect to the cage 35 with the finger 40 extending up through the open lower end of the cage 35 and a stator shell S therein. In operation the segmental gear 42 and the finger 40 carried thereby are rotated back and forth between the lower position of the finger 40 as shown in Fig. 2 and the upper position as shown in Fig. 6, which carries the threading nozzle 41 alternately up and down through the stator shell S in the cage 25.

The finger 40 with the nozzle 41 carried thereby, and the cage 35 with the stator shell S therein, are actuated in sequentially timed relation with respect to each other by two servo mechanisms which are generally indicated by the numerals 50 and 70. The servo mechanism 50 which rotates the cage 35 back and forth about a vertical axis during operation comprises the servo motor 51, the rate generator 52, the resolver 53 and the servo control and amplifier 54. The cage 35 is driven by the servo motor 51 through a pinion gear 55 which is secured to the armature shaft 56 of the servo motor 51, the gear 57 which is secured to the lower end of a shaft 58 in mesh with the gear 55, and a gear 59 which is secured to the upper end of the shaft 58 in mesh with the gear 38 carried by the cage 35. The rate generator 52 is driven by the servo motor 51 through a gear 60 which meshes with the pinion gear 55, and the resolver 53 is driven through a gear 61 which meshes with the cage gear 38. The servo mechanism 70 which rotates the finger 40 and nozzle 41 up and down about a horizontal axis during operation comprises the servo motor 71, the rate generator 72, the resolver 73, and the servo control and amplifier 74. The finger 40 is driven by the servo motor 71 through a pinion gear 75 which is secured to the armature shaft 76 of the servo motor 71, the gear 77 which is secured to one end of a horizontal shaft 78 in mesh with the gear 75, a gear 79 which is secured to the other end of the shaft 78 in mesh with a gear 80 which in turn meshes with the segmental gear 42 to which the finger 40 is secured. The resolver 73 is driven by the gear 80 which is secured to the rotor shaft 81 thereof. The rate generator 72 is driven by the servo motor 71 through a pinion gear 82 which is secured to the other end of the servo motor armature shaft 76 and a meshing gear 83 secured to the rotor shaft 84 of the rate generator 72. The timed sequential operation of the servo mechanisms 50 and 70 is controlled by a suitable programming mechanism, which determines the order in which the selected pairs of stator slots are wound and the number of winding loops which are wound in each pair of stator slots. One such programming mechanism is shown in my aforesaid copending application, and since it per se forms no part of the present invention, it is not shown and described in detail herein.

Figure 8:
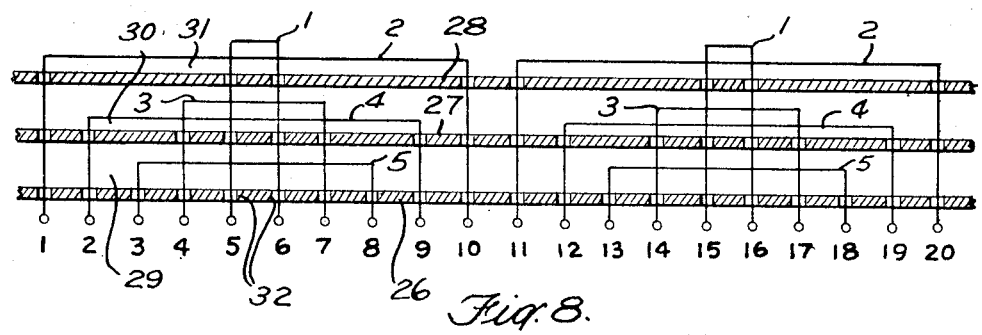
Fig. 8 is a diagrammatic view in plan illustrating the order in which selected pairs of shell slots are successively wound.

In Figs. 10 and 12 of the drawings I have shown a slightly modified form of winding mechanism in which a second winding finger 200, similar to the winding finger 40, is employed. The winding finger 200 is disposed in alignment with the finger 40 and is rotatably mounted upon a suitable shaft 201 carried by brackets 202 secured to and extending downwardly from the underside of the table 37. The finger 200 is provided with gear teeth 203 which mesh with gear teeth 204 on the finger 40, through which the finger 200 is driven in unison with the finger 40 by the gear 80. The finger 200 will then wind the slots 11 to 20 simultaneously with the winding of the slots 1 to 10 by the finger 40 in the following order as is diagrammatically shown in Fig. 8. While the finger 40 is winding the slots 5 and 6 the finger 200 will wind the slots 15 and 16; while the finger 40 is winding the slots 1 and 10 the finger 200 will wind the slots 11 and 20; while the finger 40 is winding the slots 4 and 7 the finger 200 will wind the slots 14 and 17; while the finger 40 is winding the slots 2 and 9 the finger 200 will wind the slots 12 and 19, and while the finger 40 is winding the slots 3 and 8 the finger 200 will wind the slots 13 and 18. This will eliminate the necessity of rotating stator shell S and the cage 35, 180° after the slots 1 to 10 have been wound preparatory for the winding of slots 11 to 20, and will materially decrease the time required for completely winding a stator shell. In this form of the invention fingers 40 and 200 and the cage 35 are all driven in timed sequential relation with respect to each other by the same actuating and control mechanism used in connection with the form of winding mechanism shown in Figs. 1 to 9.

From the foregoing it will be apparent to those skilled in this art that I have provided a very simple and efficient method of winding stators by which the objects of the invention are accomplished, and it is to be understood that I am limited only by the scope of the appended claims.

What is claimed is:

1. The method of winding electrical apparatus stator shells having a plurality of radially extending slots therein which comprises providing a pair of similar end caps having radially spaced concentric upwardly extending outermost, intermediate and innermost annular flanges which progressively decrease in height from the outermost flange to the innermost flange and which define outermost, intermediate and innermost annular zones, said caps and the annular flanges thereon being provided with radially extending slots which are adapted to register with the slots in a stator shell to be wound; and applying one of said caps to each end of a stator shell to be wound with the slots in the end caps in register with the slots in said shell, winding a plurality of loops of winding wire in selected pairs of slots with the upper and lower sections of said loops being disposed in the outermost zones of said end caps radially outside the outermost flanges, winding a plurality of loops of winding wire in other selected pairs of slots with the upper and lower sections of said loops being disposed in the intermediate zones of said end caps between the outermost and intermediate flanges thereof, and winding a plurality of loops of winding wire in still other selected pairs of slots with the upper and lower sections of said loops being disposed in the innermost zones of said end caps between the intermediate and innermost flanges thereof.

2. The method of winding electrical apparatus stator shells having a plurality of equally spaced radially extending slots therein which comprises providing a pair of similar end caps having radially spaced concentric upwardly extending outermost, intermediate and innermost annular flanges which progressively decrease in height from the outermost flange to the innermost flange and which define outermost, intermediate and innermost annular zones, said caps and the annular flanges thereon being provided with radially extending slots which are adapted to register with the slots in a stator shell to be wound applying one of said caps to each end of a stator shell with the slots in said end caps in register with the slots in said shell, moving winding wire back and forth through said shell and said end caps thereon in a fixed path with a dwell in the movement thereof beyond each of said end caps, inserting the wire in one slot of a selected pair of slots during the movement of the wire in one direction, inserting the wire in the other slot of said selected pair of shell slots during the movement of the wire in the opposite direction, rotating said shell in one direction through a predetermined angle during the dwell in the movement of the wire adjacent one end cap and rotating said shell in the opposite direction through said angle during the dwell in the movement of the wire adjacent the other end cap, whereby first one and then the other slot of said selected pair of shell slots are alternately brought into register with said fixed path until a predetermined number of loops of wire have been wound into said selected pair of shell slots with the end sections of said loops being disposed in the outermost zones of said end caps behind the outermost flange thereof, winding other selected pairs of shell slots in a like manner with the end sections of the loops being disposed in the intermediate zones of said end caps between the intermediate and outermost flanges thereof, and then winding still other selected pairs of shell slots in a like manner with the end sections of the loops being disposed in the innermost zones of said end caps between the innermost and intermediate flanges thereof.

3. The method of winding electrical apparatus stator shells having a plurality of equally spaced radially extending slots therein which comprises providing a pair of similar end caps having radially spaced concentric upwardly extending outermost, intermediate and innermost annular flanges which progressively decrease in height from the outermost flange to the innermost flange and which define outermost, intermediate and innermost annular zones, said caps and the annular flanges thereon being provided with radially extending slots which are adapted to register with the slots in a stator shell to be wound applying one of said caps to each end of a stator shell with the slots in said end caps in register with the slots in said shell, moving winding wire back and forth through said shell and said end caps thereon in a straight path with a dwell in the movement thereof beyond each of said end caps, alternately bringing said path and one slot of a selected pair of slots into register with each other and then bringing said path and the other slot of said selected pair of slots into register with each other during the dwells in the movement of said wire, inserting said wire into one slot of said selected pair of slots during the movements of said wire in one direction and inserting said wire in the other slot of said selected pair of slots during the movement of said wire in the opposite direction until a predetermined number of loops of wire have been wound into said selected pair of slots, with the end sections of said loops being disposed in the outermost zones of said end caps behind the outermost flanges thereof, winding other selected pairs of shell slots in a like manner with the end sections of the loops being disposed in the intermediate zones of said end caps between the intermediate and outermost flanges thereof, and then winding still other selected pairs of shell slots in a like manner with the end sections of the loops being disposed in the innermost zones of said end caps between the innermost and intermediate flanges thereof.

4. The method of winding electrical apparatus stator shells having a plurality of equally spaced radially extending slots therein which comprises providing a pair of similar end caps having radially spaced concentric upwardly extending outermost, intermediate and innermost annular flanges which progressively decrease in height from the outermost flange to the innermost flange and which define outermost, intermediate and innermost annular zones, said caps and the annular flanges thereon being provided with radially extending slots which are adapted to register with the slots in a stator shell to be wound applying one of said caps to each end of a stator shell with the slots in said end caps in register with the slots in said shell, moving winding wire back and forth through said shell and the end caps thereon in a plurality of straight paths with a dwell in the movement thereof beyond each of said end caps, alternately bringing each of said paths and first one slot of each of a plurality of selected pairs of slots into register with each other and then each of said paths and the other slot of each of said plurality of selected pairs of slits into register with each other during the dwells in the movement of the wire, simultaneously inserting said wire into said one slot of each of said plurality of selected pairs of slots during the movement of the wire in one direction, simultaneously inserting said wire into said other slot of each of said plurality of selected pairs of slots during the movement of the wire in the opposite direction, until a predetermined number of loops of wire have been simultaneously wound into each of said plurality of selected pairs of shell slots with the end sections of said loops disposed in the outermost zones of said end caps behind the outermost flanges thereof, simultaneously winding another plurality of selected pairs of shell slots in a like manner with the end sections of the loops disposed in the intermediate zones of said end caps between the intermediate and outermost flanges of said end caps, and then simultaneously winding still another plurality of selected pairs of shell slots with the end sections of the loops disposed in the innermost zones of said end caps between the innermost and intermediate flanges thereof.

References Cited in the file of this patent

UNITED STATES PATENTS

| 823,265 | De Planque et al. | June 12, 1906 |
| 2,304,520 | Wirtz et al. | Dec. 8, 1942 |

FOREIGN PATENTS

| 710,366 | Germany | Sept. 11, 1941 |